Patented June 20, 1939

2,163,526

UNITED STATES PATENT OFFICE 2,163,526

METHOD OF PREPARING A SYNTHETIC DECOLORIZING COMPOSITION

Lyle Caldwell, Los Angeles, Calif.

No Drawing. Application October 13, 1937, Serial No. 168,749

4 Claims. (Cl. 252—2)

This invention relates to the preparation of a decolorizing material and pertains particularly to a method of producing, by synthesis, a decolorizing or bleaching material of substantially unvarying chemical and physical properties at a relatively low cost.

One of the principal objects of the present invention is to provide a process for preparing a synthetic material having pronounced decolorizing properties, a high filtration rate as compared with most known inorganic bleaching materials, and a markedly low "cake retention", that is, the retention of the filtrate in the filter-cake.

A further important object of the invention is to provide a method for the production of a bleaching material at a materially lower cost as compared with hitherto proposed methods.

This application is a continuation-in-part of my copending application Serial No. 755,639, filed December 1, 1934.

According to this invention, a molten calcium-containing silicate is subjected to physical subdivision in the production of a wool-like product comparable to that material commercially known as "mineral wool", which wool is subsequently subjected to chemical reaction with a salt or chemical compound of magnesium, in the presence of water and at a superatmospheric temperature and pressure to cause a base-exchange reaction between the silicate wool material and the reagent in the production of a hydrated magnesium silicate. The molten calcium-containing silicate may comprise a material prepared by melting equimolecular proportions of calcium oxide (lime), and silicon dioxide (silica), in the production of a fluent mass. It will be appreciated that proportions other than equimolecular may also be employed, depending upon the molecular proportion of lime to silica desired in the molten product.

Certain naturally-occurring minerals are also useful in the process, among which may be mentioned the minerals which are mineralogically classified as pyroxenes, bearing the general formula $RSiO_3$, where R consists principally of calcium plus magnesium, giving rise to minerals such as diopside, $CaMg(SiO_3)_2$, and tremolite, $CaMg_3(SiO_3)_4$, as well as wollastonite, $CaSiO_3$, which contains substantially no magnesium. Others of the pyroxenes contain some iron, aluminum, manganese, zinc, and like metals, usually along with but sometimes in place of the calcium or magnesium above mentioned. The pyroxenes which are suitable in the present process are more particularly those pyroxenes which are high in calcium, and of these, the mineral wollastonite has been found to be highly advantageous. All of the pyroxenes, however, are essentially anhydrous silicates and are available in relatively pure form.

The speed of the high temperature high pressure aqueous reaction may be further increased, and the proportion of water hydration of the final product may also be increased by blowing the fused pyroxene or calcium containing silicate with water vapor in the formation of the slag wool, this operation appearing to partially hydrate the slag wool, or at least alter the physical characteristics thereof to such an extent that the base-exchange reaction with the desired soluble magnesium salt is materially facilitated.

As a specific example of the practice of the present invention, suitable raw materials such as lime and silica may be subjected to fusion in the formation of a molten calcium-containing silicate, and this material blown with air or other gaseous medium to form a slag wool, and this slag wool is then preferably subjected to a disintegrating operation to effect a reduction in the length of the produced fibers, and is subsequently subjected to superatmospheric temperature and pressure treatment with a suitable aqueous reagent containing a soluble salt of magnesium and a strong acid. In this connection the gaseous medium employed in the production of the slag wool may advantageously comprise water vapor in whole or in part. The above-mentioned superatmospheric temperature and pressure treatment may be carried out by mixing the disintegrated wool material with an aqueous solution of magnesium chloride containing a molecular quantity of magnesium which is preferably somewhat in excess of the molecular quantity of the calcium present in the calcium-containing silicate, and subjecting the mixture to autoclaving at a temperature approximating 250° centigrade and at a gauge pressure of approximately 465 pounds per square inch for a period of one and one-half hours, preferably under conditions of agitation. The reacted material is then cooled, subjected to a filtering and washing operation to remove the water-soluble reaction products, which consist principally of calcium chloride, and dried. The reacted and washed material has been found to require no regrinding, and is generally of a smaller particle size than that of the raw mineral from which it was prepared.

As a modification of the above process, a suitable pyroxene such as wollastonite may be subjected to fusion in a suitable furnace, blown with air to form a slag wool, disintegrated by means of a fan type milling apparatus or the like, and then subjected to the high pressure autoclaving.

When the raw material is prepared for reaction by fusion and blowing as above described, to produce a wool-like product, it has been found that the degree of hydration of the material in the base-exchange reaction is materially increased, and a more effective bleaching material obtained. A very complete substitution of the calcium present in the calcium-containing silicate is obtained by the magnesium, and with specific reference to the treatment of a calcium-containing pyroxene, a wollastonite which showed 42% calcium oxide by analysis resulted in a bleach material containing approximately one-half of one per cent calcium oxide and approximately 22% combined water.

It has been found that the bleaching efficacy of a material prepared according to this invention is quite comparable to acid-treated clays when employed in the treatment of vegetable oils, and it has been found that the filtration rate of the material on oils is as much as 400% greater than any of the so-called "fast-filtering" acid-treated clays, while the cake retention has been found to be materially less than any of the known acid-treated clays. The composition of the finished product is essentially that of a hydrated magnesium silicate, and the bleaching properties of the material have not been found to alter on standing, thus indicating a substantially stable composition.

The above specific example of autoclaving at 250° centigrade and 465 pounds per square inch gauge pressure is given by way of example only, and it will be appreciated that higher or lower temperatures and pressures may advantageously be employed, with a corresponding reduction or increase in the length of time required for the completion of the reaction. One of the essential requirements of the process is that of employing a high order of physical subdivision for the mineral reagent, as the hydrothermal base-exchange reaction appears to be substantially confined to a surface reaction where particles coarser than minus 200 mesh are employed as a raw material.

I have found that magnesium salts other than magnesium chloride are useful according to the present process in effecting the desired base-exchange reaction. For example, I have employed magnesium sulphate with good results, though the presence of calcium sulphate as a reaction product resulting from the use of magnesium sulphate causes a dilution of the active ingredient and in some cases the efficacy of the material as a bleach is reduced. Such a material is still valuable as a commercial bleaching agent, however, in that a higher yield is obtained by the reaction and the product may be sold at a lower figure than can the product made with magnesium chloride. In the event the material is of lower efficiency due to the diluent action of the calcium sulphate, the user would merely have to use a somewhat greater quantity of this lower cost material to obtain the required bleach.

I have also found that the bleaching or adsorptive properties of materials formed as above described may be increased by treatment with an aqueous acid solution, such as about 30 to 40% HCl or $H_2SO_4$, preferably heated to a temperature above atmospheric, the increased efficiency upon acid treatment being apparently due to increased hydration of the magnesium silicate and to removal of acid-soluble impurities.

I claim:

1. The method of preparing a bleaching material which comprises: preparing a molten mix comprising a calcium-containing silicate; forming a slag wool from the molten calcium-containing silicate by blowing with a gaseous fluid, and subjecting said slag wool to reaction with an aqueous solution of a soluble magnesium salt of a strong acid under conditions of agitation to cause formation of a solid hydrated magnesium silicate and a calcium salt of said strong acid by hydrothermal reaction of said calcium-containing silicate with said soluble magnesium salt, and to produce a solid bleaching material containing a substantial proportion of said hydrated magnesium silicate, and separating said bleaching material from the remaining aqueous liquid.

2. The method set forth in claim 1, said gaseous fluid consisting at least in part of water vapor.

3. The method of preparing a bleaching material which comprises: subjecting a calcium-bearing mineral selected from the pyroxene mineralogical group to fusion; forming a slag wool from the molten pyroxene by blowing with a gaseous fluid, and subjecting said slag wool to reaction with an aqueous solution of a soluble magnesium salt of a strong acid under conditions of agitation to cause formation of a solid hydrated magnesium silicate and a calcium salt of said strong acid by hydrothermal reaction of said mineral with said soluble magnesium salt, and to produce a solid bleaching material containing a substantial proportion of said hydrated magnesium silicate, and separating said bleaching material from the remaining aqueous liquid.

4. The method set forth in claim 3, said gaseous fluid consisting at least in part of water vapor.

LYLE CALDWELL.